United States Patent [19]

Renker et al.

[11] Patent Number: 4,696,839

[45] Date of Patent: Sep. 29, 1987

[54] POLYMER CONCRETE ARTICLES AND PROCESS FOR MANUFACTURING SAME

[75] Inventors: Hansjoerg Renker, Hilterfingen; Martin Abegglen, Interlaken, both of Switzerland

[73] Assignee: Fritz Studer AG, Thun, Switzerland

[21] Appl. No.: 826,208

[22] Filed: Feb. 5, 1986

[30] Foreign Application Priority Data

Feb. 5, 1985 [DE] Fed. Rep. of Germany ....... 3503763

[51] Int. Cl.⁴ ................................................ C08K 3/36
[52] U.S. Cl. ........................................ 428/15; 106/90; 264/71; 264/333; 428/327; 524/5
[58] Field of Search ............... 106/90; 156/61; 264/71, 264/333; 428/15, 327; 524/5

[56] References Cited

U.S. PATENT DOCUMENTS

| | | | |
|---|---|---|---|
| 3,538,036 | 11/1970 | Peters et al. | 428/327 X |
| 3,854,267 | 12/1974 | Weiant et al. | 524/494 X |
| 3,861,990 | 1/1975 | Kasai et al. | 428/543 |
| 3,950,604 | 4/1976 | Penneck | 428/331 X |
| 3,953,629 | 4/1976 | Wesch | 428/36 |
| 4,298,559 | 11/1981 | Baney et al. | 428/446 X |
| 4,299,761 | 11/1981 | Emmons et al. | 428/136 X |
| 4,310,481 | 1/1982 | Baney | 428/698 X |
| 4,375,489 | 3/1983 | Muszynski | 428/36 |
| 4,382,055 | 5/1983 | Koyanagi et al. | 428/703 X |
| 4,400,413 | 8/1983 | Emmons et al. | 428/63 X |
| 4,441,944 | 4/1984 | Massey | 427/245 X |
| 4,514,531 | 4/1985 | Kleeb et al. | 524/5 |

OTHER PUBLICATIONS

*Betonwerk & Fertigteil Technik,* "Polymer Concrete", Dr. Werner Reidt, pp. 564-570, 8/1984.

*Primary Examiner*—Henry F. Epstein

[57] ABSTRACT

A process is provided for the manufacturing of machine parts wherein a concrete polymer including a filler mixture formed of rock particles and a binding agent matrix is employed. It is provided that as the fine part of the filler mixture, particles are used that are made of mechanically resistant materials having a modulus of elasticity that is higher than the rock. It is also provided that essentially cubic broken rock particles are used and that the mixture of rock and fine particles and the binding agent system is condensed in a casting mold in such a way that as many of the adjacent particles as possible contact one another.

20 Claims, 1 Drawing Figure

U.S. Patent        Sep. 29, 1987        4,696,839
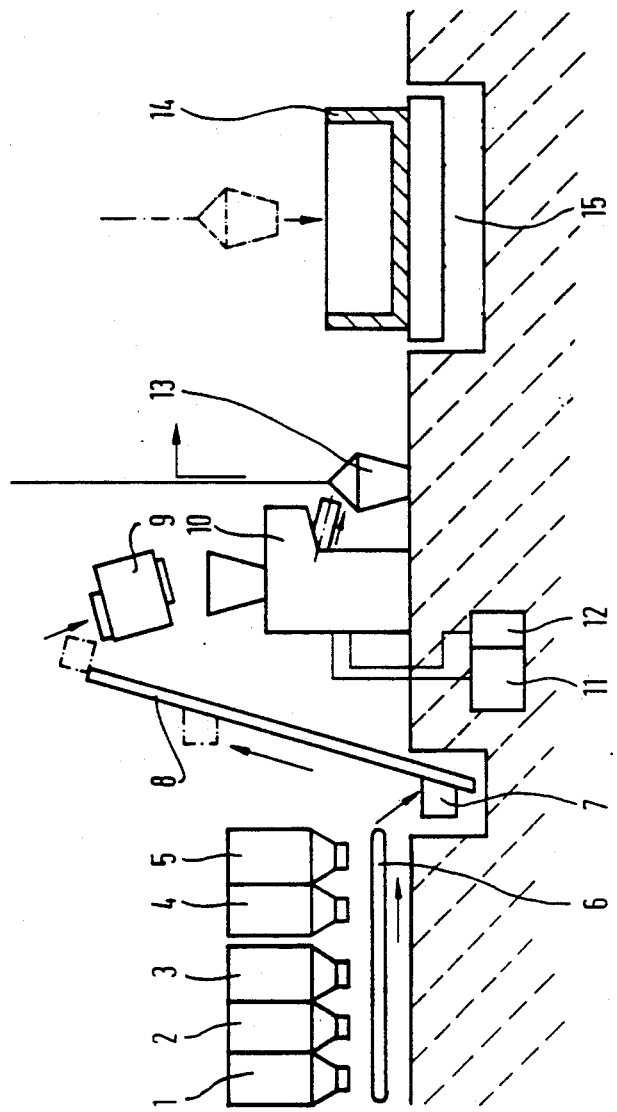

POLYMER CONCRETE ARTICLES AND PROCESS FOR MANUFACTURING SAME

BACKGROUND AND SUMMARY

The present invention relates to a process for the manufacturing of articles, particularly of machine parts, such as engine beds, machine tool tables, measuring tables or similar objects made of concrete polymer and articles made by each such process, wherein a filler mixture of rock particles is mixed with a system of binding agents consisting of resin, hardeners and admixtures. The filler mixture and binding agent system are filled into a casting mold and condensed. Particles broken from rocks of a high hardness in a mixing ratio defined by a particle-size distribution curve are employed, and a binding agent system is used which, in its liquid state, wets the particles and causes a lubricating effect during the condensing.

In the case of a known processes disclosed in the publication "PLEXILITH MA-Beton Konstruktionsteile" of Rohm Gmbh, Darmstadt, rock particles are coated with a binding agent in order to achieve good cohesion. The mechanical stability and the modulus of elasticity of this type of concrete polymer are influenced considerably by the binding agent. Difficulties occur with respect to the long term behavior, particularly with respect to creep stability because stabilization occurs only after a long period of time, e.g. after a period of more than 100 days.

It has also been pointed out in a lecture (H. Tanner, Fritz Studer AG, "The Use of Concrete Polymer in Machine Tool Building", Mar. 18, 1983, Regensdorf-Zurich) that it is to be endeavored that the forces stressing an engine bed are, if possible, all to be transmitted in form closure by the rock. A binding agent system is to be used which causes a lubricating effect for the rock particles during the processing and during the condensing. In this lecture, it was also pointed out that the rock particles of the different grain sizes, the ratio of mixture of which is defined by a particle-size distribution curve, should not be weakened by microcracks. When selecting the rock, it should not be taken into account that rocks are used that have a high stability as well as a high density and a structure that, if possible, has no direction. It was stated that deep-seated rock is preferred, such as basalt, flint, gabbro, greenstone, diabase and diorite. It was also pointed out that the break structure of the surfaces and the shaping of the rock are of considerable significance.

An objective of the present invention is the provision of a process of the initially mentioned type by means of which articles, particularly machine parts, can be manufactured that have a higher stability as well as a good long term behavior and good creep stability.

Another objective of the present invention is the provision of articles made from concrete polymer mixtures which exhibit high stability, great strength and good long term creep resistance.

These and other objectives of the present invention are attained by the provision of a process wherein particles of mechanically resistant substances that have a higher modulus of elasticity than the rock are employed as the fine part of the filler mixture. Essentially cubic broken rock particles are used and the mixture of rock and fine particles and a binding agent system is condensed in the casting mold in such a way that as many as possible of the adjacent particles touch one another. In this manner, the binding agent system is at least partially displaced between the particles and is driven into hollow spaces between the particles and the exterior side.

By means of this process, machine parts can be made of concrete polymer which in their characteristics are influenced only relatively little by the binding agent. By the use of a fine part for the filler mixture that is made of mechanically resistant substances, the mechanical characteristics and particularly the modulus of elasticity and the stability can be improved significantly, since up to now, the fine part was responsible to a considerable degree for a lowering of these values. A concrete polymer of this type has characteristics that come very close to the characteristics of natural rock, and even results in certain improvements. Since the rock particles and the fine particles consisting of mechanically resistance materials rest directly against one another and support each other, applied forces are transmitted directly via the particles. The use of particles that are as cubic as possible is a considerable advantage since particles of this shape can advantageously be fitted together to a tight packing and make possible a planar contact with one another. In this case, it is also advantageous that the particles have serrated or fluted surfaces of fracture because they can then hook one another so that they can also transmit forces that are not aimed vertically to the surfaces located on one another. The particles hook into one another so that they can also no longer be slid with respect to one another. By means of the direct transmitting of applied forces between the particles made of rock and also of mechanically resistant material, while largely avoiding the binding agent, there is also almost no contracting at the dimensions of the machine parts during the hardening. The long term behavior and especially the creep stability are significantly improved.

Since very fine particles, particularly meal grain, negatively influence the creep stability and also the modulus of elasticity of the components made of concrete polymer, the proportion of the fine particles should be kept as low as possible. In a further development of the invention, it is therefore provided that the particle-size distribution curve for the ratio of mixture of the grain sizes of the rock particles is determined by tests in which test specimens are subjected to a creep test, after which, depending on the results, the proportion of very fine particles is determined. This determination takes place in such a way that on the one hand, an inadmissible creep is excluded while, on the other hand, the occurrence of hollow spaces exceeding the size of individual pores is avoided.

In a further development of the invention, rock particles made of a mechanically resistant material are used, the grain of which is larger than 1 mm. It was found that for achieving a significant improvement of the stability and of the modulus of elasticity of concrete polymer it is sufficient to provide the fine proportion up to about a grain of 1 mm of particles made of a mechanically resistant material.

In a further development of the invention, it is provided that as the fine part, particles are provided that are made of a compound selected from the group comprising aluminum oxide, silicon carbide, silicon nitride or quartz or of a mixture of these materials. These materials, on the one hand, have a very high modulus of elasticity which is even far greater than the values for steel. On the other hand, however, they are materials that are available in a sufficient quantity at a reasonable price so that, as a result, the production as a whole does not become more expensive.

The overall result is the important advantage that in the case of machine parts manufactured according to the invention, a decrease of the wall thicknesses or other dimensions is possible while, by means of the fine portion of a mechanically resistant material, the stability characteristics are clearly improved.

In a further development of the invention, it is provided that a binding agent system is used that in the liquid state has a viscosity of about 100 to 300 mPa sec. A binding agent system is suitable, for example, that consists of a biphenolic-A-epoxy resin with a hardener made of aliphatic polyamines. This binding agent on the one hand, has such a viscosity that it permits the rock particles to relatively easily slide into the position corresponding to the largest packing density while, on the other hand, it can just as easily be displaced between the particles. Naturally, the binding agent system must be adjusted in such a way that it does not reach its gelling point before the end of a final condensation. In practice, it was found to be advantageous when the binding agent is adjusted in such a way that the gelling point is reached after about two to three hours.

Before making concrete polymer, a suitable type of rock has to be selected. This selection is made with a view to the desired characteristics of the finished components made of concrete polymer, i.e., particularly with a view to maximum stability and a maximum modulus of elasticity. The modulus of elasticity of the rock should be above 35,000 N/mm$^2$. Since the rock particles in the finished component made of concrete polymer are to transmit the applied forces directly among one another, they should, if possible, have no microcracks. A selection of the rock type therefore is made according to the geological origin of the rock. Deep-seated rock, such as basalt, flint, gabbro, greenstone, diabase or diorite which during their formative history were subjected to no folding or similar process so that the danger of microcracks is relatively small are preferred rock-types. The presence of microcracks is examined by means of specimens. When the rock is selected, an analysis of the composition of the rock is also carried out as well as an examination with respect to physical and mechanical characteristics. For example, the specific weight, the thermal conductivity, the thermal coefficient of expansion, or similar characteristics as well as the modulus of elasticity and the tensile strength are tested.

After the selection of the rock type on the basis of the above-explained criteria, the rock is crushed. After the crushing, another test will take place as to whether the rock is suitable to be used for a concrete polymer in which case also at the same time the quality of the crushing is examined by a checking for microcracks. After the crushing, the shape of the broken rock particles is tested also. The rock particles are to have a particle shape that is as cubic as possible, in which case an admissible edge length ratio of about 1:1.4 is determined. The maximum allowable proportion of grains having unsuitable shapes and curves is less than 30% (by number). When the thus defined cubic shape is not obtained, the selected rock is not suitable for the manufacturing of a concrete polymer of the desired quality.

Together with cleaning and drying, the rock particles are sorted by sifting, namely ranging from meal grain (about 4 microns) to coarse grain (16 mm and larger). The sorting takes place in at least five steps. The sorted rock particles having a grain size starting at about 1 mm are filled into containers or receptacles corresponding to their grain size. From these receptacles or containers, the rock particles of the various grain sizes are taken in amounts which, according to a particle size distribution curve that was determined previously for each rock type, are added together in a defined ratio of mixture. It will be explained later how the particle size distribution curve is determined.

The fine particles, i.e., rock particles up to a size of about 1 mm, are not used. Instead, particles of a mechanically resistant material are used, i.e., of a material that has a higher modulus of elasticity and also a higher tensile strength than the rock. Preferably aluminum oxide, silicon carbide, silicon nitride or quartz are each provided alone or in mixtures as the mechanically resistant material. These mechanically resistant materials can be made available in sufficiently large quantities at a reasonable price. Metals may also be provided as mechanically resistant materials, such as steel or gray cast iron particles by means of which an improvement of the characteristics of the concrete polymer can also be achieved. Such metallic materials should, however, only be used when it is known that the machine parts made of concrete polymer are subjected to no significant thermal stress. Otherwise, particularly as a result of different thermal expansions, damage may arise in the concrete polymer. The mentioned materials, in addition, as compared to metals, have the advantage that their modulus of elasticity is at least twice as high as the modulus of elasticity of steel, so that the desired effect can be realized to a greater degree.

Further objects, features, and advantages of the present invention will become more apparent from the following description when taken with the accompanying drawings(s) which show, for purposes of illustration only, an embodiment/several embodiments in accordance with the present invention.

BRIEF DESCRIPTION OF THE DRAWING

A fully automatic arrangement for producing articles made of concrete polymer in accordance with the present invention is shown in the drawing.

DETAILED DESCRIPTION OF THE DRAWING

The arrangement according to the attached drawing has three containers 1, 2, and 3 with rock particles sorted according to grain sizes as well as two containers 4 and 5 with particles made of mechanically resistant material of the type explained above. These containers 1 to 5 are arranged above a transport belt 6 on which the particles in amounts dosed corresponding to the determined ratio of mixture are transported for a chute 7. The chute 7 is part of a conveyor belt 8 and pours the dosed particles into a compulsory mixer 9. After a mixing in the compulsory mixer 9, the particles are poured into a mixture processing machine 10 in which a binding resin, hardener and admixtures are added which from various tanks, for example 11 and 12, are pumped into the mixture processing machine 10. The binding agent that is used preferably is a biphenolic A-epoxy resin with a hardener of aliphatic polyamines that has a minimum viscosity of between 100 to 300 mPa sec. The binding agent system is adjusted in such a way that it reaches its gelling point after about two to three hours. The mixture that was processed in the mixture processing machine is filled into pouring ladle 13 that is subsequently applied to a casting mold 14. The casting mold 14 is arranged on an oscillating table which for the condensation of the charge is set into vibrations.

The condensation time depends on the casting mold, i.e., on the size and the possibly complex shape of the machine part to be poured. During the condensation, the binding agent system, because of the adjusted viscosity, acts as a lubricant which makes it easier for the particles to reach positions in which the highest packing density exists. As a result, the particles penetrate the resin skin of the binding agent system surrounding them so that a direct contact between the particles is established. The binding agent system for the most part is pressed out toward the top so that on the upper side of the casting mold a "puddle" of the binding agent system is developed first. Since the machine part is molded in such a way that during the casting it is first upside-down, the binding agent system coming out of the mixture afterwards, after the hardening, forms the bottom side of the manufactured component. Instead of a condensing by means of causing vibrating motions, it may, under certain circumstances also be provided that the processed mixture in the casting mold 14 is compressed by applying pressure in such a way that a high packing density is reached and the binding agent system is driven out.

It is contemplated that the process of the present invention be carried out either automatically or, in the alternative completely by hand, or with any desired degree of automation.

The used casting molds, with respect to the material and the construction, must be designed in such a way that the required condensation energy can be transmitted to the charge. According to the number of pieces to be cast, the casting molds are made of wood or metal or a combination of both. The areas that are decisive for the stiffness of the components as a rule are constructed with wall thicknesses of 60 to 80 mm. This corresponds to about three times the wall thickness of a grey cast iron construction in which case, however, a comparable weight is obtained. Since accumulations of material are not damaging, especially critical areas, with respect to load, can be reinforced arbitrarily which, while the weight is increased only insignificantly, results in a significant increase of component stiffness. Hollow spaces are inserted as so-called lost cores so that a statically advantageous design of the inside shape of the component is possible. Inserts made of metal which, with respect to the positional tolerance, are in the 10th of a millimeter range, are previously fastened in the casting mold and are poured directly into the component. Completely processed machine parts that should have positional tolerances in the 100th of a millimeter range are aligned with one another and are poured in subsequently. Slideways are usually cast directly or may be cast in subsequently as finished guiding elements.

As mentioned before, for the determination of the ratio of mixture of the grain size distribution of the particles, a particle-size distribution curve is determined for each rock type. For the distribution of grains, the distribution curve according to Fuller is used as a basis first. Then test bars are cast by means of which creep tests are carried out. These test bars have a square cross-section of 80 times 80 mm and a length of one meter. They are placed on supports arranged at a distance of one meter, after which, in their center, the bending cuased by the true specific weight is measured by means of an indicating caliper. The measured values of the bending are entered as a function of the time as a creep curve. An admissible creep stability will exist when, after an indicated period of time, such as three days, for example, there is no longer a movement in the test bars, i.e., the creep is completed. In general, it should be pointed out in this connection, that the Fuller curve is approximated as a function of the shape of the rock particles.

When during the creep tests at the test bars it is found that the creep stability is not sufficient, the proportion of the very fine particles is reduced. Subsequently, test rods are made again and creep tests are carried out. If, after that, the creep stability should still not be sufficient, the reduction of the very fine particles with the subsequent pouring of test bars and the carrying-out of creep tests is repeated. The limit up to which the proportion of very fine particles can be reduced will be reached when because of the reduction of the very fine particles, they form hollow spaces in the component which exceed pore sizes. When, by means of the reduction of the very fine particles, while at the same time avoiding the formation of hollow spaces, no sufficient creep stability can be achieved, the rock material is unsuitable, particularly because of the spatial shape of the rock particles obtained during the crushing. Experience has shown that this is usually the case when the deviations from the ideal cubic shape exceed the edge length ratio of 1:1.4.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A polymer concrete article comprising:
   substantially cubic rock particles having a grain size at least equal to a preselected value, said rock particles abutting in a substantially planar manner, said rock particles having a first modulus of elasticity, and
   mechanically resistant fine particles having a grain size less than said preselected value and having a second modulus of elasticity greater than said first modulus of elasticity, said fine particles being located essentially in hollow spaces between said cubic particles, and
   a binding agent.

2. An article according to claim 1, wherein said fine particles are formed from a material selected from the group consisting of aluminum oxide, silicon carbide, silicon nitride and quartz.

3. An particle according to claim 1, wherein said fine particles are selected from a group consisting of steel and cast iron particles.

4. An article according to claim 1, wherein said rock particles are selected from a group consisting of basalt, flint, gabbro, greenstone, diabase and diorite.

5. An article according to claim 1, wherein said first modulus of elasticity is at least 35,000 N/mm$^2$.

6. An article according to claim 1, wherein said preselected value is about 1 millimeter.

7. An article according to claim 1, wherein said rock particles have a longest edge having a first length and a shortest edge having a second length, and at least a preselected minimum percentage of said particles have a preselected minimum ratio of said first length to said second length.

8. An article according to claim 7, wherein said preselected minimum percentage is at least 70 percent.

9. An article according to claim 8, wherein said preselected minimum ratio is 1 to 1.4.

10. An article according to claim 1, where said binding agent comprises a biphenolic-A-epoxy resin and a hardener comprising aliphatic polyamines.

11. A process for manufacturing a polymer concrete article comprising:

forming a polymer concrete mixture by combining substantially cubic rock particles, at least one mechanically resistant fine material having a modulus of elasticity greater than the modulus of the elasticity of the rock particles, and a binding agent, placing said polymer concrete mixture in a casting mold, and condensing said mixture in said mold so as to cause said rock particles to contact one another and to cause the binding agent and fine material to be at least partially displaced into hollow spaces between the rock particles.

12. A process according to claim 11, wherein an optimum particle-sized distribution of said rock particles is determined prior to forming said mixture.

13. A process according to claim 12, wherein said particle-sized distribution curve is determined by forming test specimens containing various particle distributions, subjecting said test specimens to creep tests, and determining said optimum particle-sized distribution on the basis of said creep tests.

14. The process according to claim 11, wherein said fines have a maximum grain of 1 mm.

15. The process according to claim 11, wherein said fines are selected from the group consisting of aluminum oxide, silicon carbide, silicon nitrite, quartz, and quartz glass.

16. A process according to claim 11, wherein said binding agent comprises a resin and a hardener.

17. A process according to claim 11, wherein said binding agent has a liquid state viscosity of about 100 to 300 mPa sec.

18. A process according to claim 16, wherein said resin comprises an epoxy resin and said hardener comprises an aliphatic polyamine.

19. A process according to claim 11, wherein said mixture is condensed in said mold by vibrating said mold.

20. A process according to claim 11, wherein said mixture is condensed in said mold by applying pressure to said mixture, said pressure causing excess binding agent system to be driven out.

* * * * *